(12) United States Patent
Hwang et al.

(10) Patent No.: US 11,807,066 B2
(45) Date of Patent: Nov. 7, 2023

(54) THERMAL MANAGEMENT SYSTEM (71) Applicant: Hanon Systems, Daejeon (KR)

(72) Inventors: In-Guk Hwang, Daejeon (KR); Sung Je Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 337 days.

(21) Appl. No.: 17/049,637

(22) PCT Filed: Mar. 27, 2019

(86) PCT No.: PCT/KR2019/003560
§ 371 (c)(1),
(2) Date: Oct. 22, 2020

(87) PCT Pub. No.: WO2019/208939
PCT Pub. Date: Oct. 31, 2019

(65) Prior Publication Data
US 2021/0245571 A1 Aug. 12, 2021

(30) Foreign Application Priority Data
Apr. 27, 2018 (KR) .................. 10-2018-0048940

(51) Int. Cl.
*B60H 1/00* (2006.01)
*B60H 1/32* (2006.01)

(52) U.S. Cl.
CPC ..... *B60H 1/00278* (2013.01); *B60H 1/00878* (2013.01); *B60H 1/00885* (2013.01);
(Continued)

(58) Field of Classification Search
CPC ............ B60H 1/00278; B60H 1/00878; B60H 1/00885; B60H 1/00899; B60H 1/32284;
(Continued)

(56) References Cited

U.S. PATENT DOCUMENTS 5,291,960 A * 3/1994 Brandenburg ........ B60W 10/26
123/41.14
5,299,431 A 4/1994 Iritani et al.
(Continued)

FOREIGN PATENT DOCUMENTS

DE 102011016070 A1 10/2012
DE 102016121362 A1 * 5/2018 ......... B60H 1/00278
(Continued)

OTHER PUBLICATIONS

Office Action dated Mar. 31, 2023 by the CIPO in the corresponding Patent Application No. 201980028615.6, with English translation.

*Primary Examiner* — Ljiljana V. Ciric
(74) *Attorney, Agent, or Firm* — Norton Rose Fulbright US LLP; James R. Crawford (57) ABSTRACT

A thermal management system includes a refrigerant circulation line including a compressor, a first heat exchanger, a first expansion valve, and a second heat exchanger configured for cooling a vehicle interior by circulating a refrigerant; a heating line configured for heating the vehicle interior by circulating cooling water heat-exchanged with the refrigerant through the first heat exchanger and heat-exchanged with a battery; a cooling line configured for cooling an electrical component by circulating cooling water heat-exchanged with air or the refrigerant.

20 Claims, 6 Drawing Sheets

(52) U.S. Cl.
CPC ..... B60H 1/00899 (2013.01); B60H 1/32284 (2019.05); *B60H 2001/003* (2013.01); *B60H 2001/00307* (2013.01); *B60H 2001/00928* (2013.01); *B60H 2001/00942* (2013.01)

(58) Field of Classification Search
CPC .... B60H 2001/003; B60H 2001/00307; B60H 2001/00928; B60H 2001/00942; B60H 1/004
See application file for complete search history.

(56) References Cited

U.S. PATENT DOCUMENTS

| | | | | |
|---|---|---|---|---|
| 5,483,807 | A * | 1/1996 | Abersfelder | B60H 1/00492 62/243 |
| 5,878,589 | A * | 3/1999 | Tanaka | F25B 1/10 165/80.2 |
| 6,038,877 | A * | 3/2000 | Peiffer | B60H 1/32284 62/244 |
| 6,124,644 | A * | 9/2000 | Olson | B60L 3/003 180/65.245 |
| 6,357,541 | B1 * | 3/2002 | Matsuda | B60K 11/02 903/905 |
| 6,360,835 | B1 * | 3/2002 | Skala | H01M 8/04029 180/65.22 |
| 6,448,535 | B1 * | 9/2002 | Ap | B60L 58/33 219/202 |
| 6,457,324 | B2 * | 10/2002 | Zeigler | B60H 1/00007 62/434 |
| 6,464,027 | B1 * | 10/2002 | Dage | F01P 3/20 123/41.14 |
| 6,569,550 | B2 * | 5/2003 | Khelifa | B60H 1/323 429/434 |
| 7,789,176 | B2 * | 9/2010 | Zhou | B60L 58/26 180/65.1 |
| 7,841,431 | B2 * | 11/2010 | Zhou | B60H 1/00278 180/65.1 |
| 8,402,776 | B2 * | 3/2013 | Johnston | B60L 58/26 62/79 |
| 8,448,696 | B2 * | 5/2013 | Johnston | B60L 58/26 165/917 |
| 9,121,643 | B2 * | 9/2015 | Schaefer | H01M 10/663 |
| 9,365,090 | B2 * | 6/2016 | Gawthrop | B60H 1/00007 |
| 9,533,545 | B2 * | 1/2017 | Chang | B60H 1/00392 |
| 9,561,704 | B2 * | 2/2017 | Enomoto | B60K 11/02 |
| 9,707,822 | B2 * | 7/2017 | Cheng | B60K 11/085 |
| 9,731,576 | B2 * | 8/2017 | Johnston | B60H 1/00921 |
| 9,731,577 | B2 * | 8/2017 | Johnston | B60H 1/00921 |
| 9,731,578 | B2 * | 8/2017 | Johnston | H01M 10/663 |
| 9,758,010 | B2 * | 9/2017 | Johnston | B60H 1/00385 |
| 9,758,011 | B2 * | 9/2017 | Johnston | B60H 1/32284 |
| 9,758,012 | B2 * | 9/2017 | Johnston | B60H 1/00921 |
| 9,802,460 | B2 * | 10/2017 | Cheng | H01M 10/6569 |
| 9,908,382 | B2 * | 3/2018 | Cheng | B60L 1/02 |
| 9,944,152 | B2 * | 4/2018 | Kim | B60H 1/00428 |
| 10,099,531 | B2 * | 10/2018 | Labaste Mauhe | B60H 1/321 |
| 10,150,383 | B2 * | 12/2018 | Gauthier | B60L 3/0061 |
| 10,272,736 | B2 * | 4/2019 | Cheng | B60L 50/64 |
| 10,406,888 | B2 * | 9/2019 | Cheng | B60H 1/143 |
| 10,427,491 | B2 * | 10/2019 | Johnston | B60H 1/323 |
| 10,525,787 | B2 * | 1/2020 | Cheng | B60H 1/2218 |
| 10,814,692 | B2 * | 10/2020 | Kim | B60H 1/32284 |
| 10,889,157 | B2 * | 1/2021 | Kim | B60H 1/00278 |
| 10,967,702 | B2 * | 4/2021 | Mancini | B60H 1/00921 |
| 11,110,772 | B2 * | 9/2021 | Oh | B60H 1/32284 |
| 11,142,037 | B2 * | 10/2021 | Kim | B60H 1/00278 |
| 11,155,138 | B2 * | 10/2021 | Kim | B60H 1/00007 |
| 11,318,816 | B2 * | 5/2022 | Kim | B60H 1/32281 |
| 11,325,444 | B2 * | 5/2022 | Kim | B60H 1/00899 |
| 11,390,141 | B2 * | 7/2022 | Kim | B60H 1/143 |
| 11,407,273 | B2 * | 8/2022 | Kim | B60H 1/00271 |
| 11,458,798 | B2 * | 10/2022 | Lee | B60L 58/26 |
| 11,458,811 | B2 * | 10/2022 | Kim | B60H 1/00007 |
| 2005/0167169 | A1 * | 8/2005 | Gering | B60H 1/08 237/12.3 B |
| 2008/0251235 | A1 * | 10/2008 | Zhou | B60L 50/51 165/59 |
| 2010/0012295 | A1 * | 1/2010 | Nemesh | H01M 10/6568 165/104.19 |
| 2012/0183815 | A1 * | 7/2012 | Johnston | B60L 58/27 429/50 |
| 2012/0304674 | A1 * | 12/2012 | Schwarzkopf | B60H 1/00878 62/238.1 |
| 2013/0118707 | A1 * | 5/2013 | Kardos | H01M 10/615 165/42 |
| 2015/0217623 | A1 * | 8/2015 | Hatakeyama | B60L 1/02 429/62 |
| 2016/0107501 | A1 * | 4/2016 | Johnston | B60H 1/00278 165/41 |
| 2016/0107502 | A1 * | 4/2016 | Johnston | B60H 1/00921 165/202 |
| 2016/0107503 | A1 * | 4/2016 | Johnston | B60H 1/00278 165/202 |
| 2016/0107504 | A1 | 4/2016 | Johnston | |
| 2016/0107505 | A1 * | 4/2016 | Johnston | B60H 1/00278 165/202 |
| 2016/0107508 | A1 * | 4/2016 | Johnston | B60H 1/00278 237/12.3 A |
| 2016/0229282 | A1 * | 8/2016 | Hettrich | B60K 11/02 |
| 2021/0370747 | A1 * | 12/2021 | Lee | F25B 25/005 |
| 2022/0097487 | A1 * | 3/2022 | Jin | B60K 11/04 |
| 2022/0349627 | A1 * | 11/2022 | Lee | B60H 1/00278 |

FOREIGN PATENT DOCUMENTS

| | | | | |
|---|---|---|---|---|
| DE | 112017000275 | T5 * | 9/2018 | ............... B60H 1/00 |
| DE | 112019006348 | T5 * | 9/2021 | ......... B60H 1/00278 |
| DE | 102016121362 | B4 * | 2/2023 | ......... B60H 1/00278 |
| EP | 3480040 | A1 * | 5/2019 | ......... B60H 1/00278 |
| KR | 20110133415 | A | 12/2011 | |
| KR | 20130003726 | A | 1/2013 | |
| KR | 101242717 | B1 | 3/2013 | |
| KR | 101703604 | B1 | 2/2017 | |
| KR | 20180007021 | A | 1/2018 | |
| KR | 101846923 | B1 | 4/2018 | |
| WO | WO-2019208939 | A1 * | 10/2019 | ......... B60H 1/00278 |

* cited by examiner

THERMAL MANAGEMENT SYSTEM

This application is a national phase under 35 U.S.C. § 371 of International Application No. PCT/KR2019/003560 filed Mar. 27, 2019, which claims the benefit of priority from Korean Patent Application No. 10-2018-0048940 filed Apr. 27, 2018. The entire contents of these applications are incorporated herein by reference in their entirety.

FIELD OF THE INVENTION

The present invention relates to a thermal management system, and more particularly, to a system for managing heat of electrical components and a battery in a vehicle as well as cooling and heating of the vehicle.

BACKGROUND OF THE INVENTION

In recent years, electric vehicles are being spotlighted as solutions to problems such as the implementation of environmentally friendly technologies and energy depletion in the automotive field.

The electric vehicles run using a motor that is driven by receiving power from a battery or a fuel cell, and therefore, carbon emissions are low and noise is low. In addition, the electric vehicles are eco-friendly because motors that have higher energy efficiency than conventional engines are used.

However, thermal management is important because the electric vehicles generate a lot of heat during operation of the battery and the motor. In addition, since it takes a long time to recharge the battery, it is important to manage the use time of the battery efficiently. In particular, in the electric vehicles, since a refrigerant compressor that is driven for air conditioning a vehicle interior is also driven by electricity, it is more important to manage the use time of the battery.

OBJECTS AND SUMMARY OF THE INVENTION

An object of the present invention is to provide a thermal management system that may manage heat of electrical components and a battery in a vehicle as well as cooling and heating of the vehicle.

In addition, an object of the present invention is to provide a thermal management system the may increase a use time of a battery by reducing power consumption.

In one general aspect, a thermal management system includes: a refrigerant circulation line including a compressor, a first heat exchanger, a first expansion valve, and a second heat exchanger, and cooling the vehicle interior by circulating refrigerant circulating therethrough; a heating line heating the vehicle interior by circulating cooling water heat-exchanged with the refrigerant through the first heat exchanger and heat-exchanged with a battery; and a cooling line cooling an electrical component by circulating the cooling water heat-exchanged with air or the refrigerant.

The battery may be a solid electrolyte cell.

The heating line and the cooling line may be connected or disconnected according to an indoor cooling mode or a vehicle interior heating mode.

In the vehicle interior cooling mode, the heating line and the cooling line may be connected to each other.

The heating line and the cooling line may be connected to one line in series.

In the vehicle interior heating mode, the heating line and the cooling line may be disconnected from each other.

The cooling line may include a first connection line branched from one side of the cooling line and connected to the heating line; and a second connection line branched from the other side of the cooling line and connected to the heating line.

The first connection line, the second connection line, and the heating line are connected to a first direction switching valve, so that the cooling line and the heating line may be connected or disconnected by the first direction switching valve.

The electrical component may be disposed on the first connection line or the second connection line.

The refrigerant circulation line may further include a second expansion valve throttling or bypassing the refrigerant discharged from the first heat exchanger; and a third heat exchanger heat-exchanging the refrigerant discharged from the second expansion valve with air and discharging the refrigerant to the first expansion valve.

The thermal management system may further include a third expansion valve throttling or bypassing the refrigerant discharged from the first heat exchanger, or blocking a flow of the refrigerant; and a fourth heat exchanger heat-exchanging the refrigerant discharged from the third expansion valve with the cooling water of the cooling line.

The electrical component may be cooled by cooling water heat-exchanged with the fourth heat exchanger.

The cooling line may further include a radiator for cooling the cooling water with air, and the electrical component may be cooled by cooling water cooled by the radiator or cooling water cooled by the fourth heat exchanger.

The fourth heat exchanger and electrical component may be connected in series or in parallel by the cooling line.

The heating line may include a fifth heat exchanger heat-exchanging the cooling water heat-exchanged with the refrigerant through the first heat exchanger and air introduced into the vehicle interior to heat the vehicle interior using heated air; and a cooling water heater disposed in front of the fifth heat exchanger in a flow direction of the cooling water to heat the cooling water.

In a defrost mode in an indoor cooling mode, the second expansion valve may bypass the refrigerant.

In a dehumidification mode in a vehicle interior cooling mode, the refrigerant throttled through the first expansion valve may pass through the second heat exchanger, and air introduced into the vehicle interior may be dehumidified through the second heat exchanger and then heated through a fifth heat exchanger and then supplied to the vehicle interior.

In a heating mode of the battery, the battery may be heated by the cooling water heated by an operation of the cooling water heater.

In a mild heating mode, the heating line and the cooling line may be connected to one line in series to recover waste heat of the battery and the electrical component and use the waste heat for heating the vehicle interior.

Advantageous Effects

The thermal management system of the present invention has an advantage of increasing the use time of the battery by reducing the power consumption.

In addition, the thermal management system of the present invention has an advantage of reducing maintenance cost and manufacturing cost by enabling a design of a refrigerant line and a cooling water line having a simple structure.

DETAILED DESCRIPTION

Hereinafter, a thermal management system according to the present invention having the configuration as described above will be described in detail with reference to the accompanying drawings.

Figure 1:
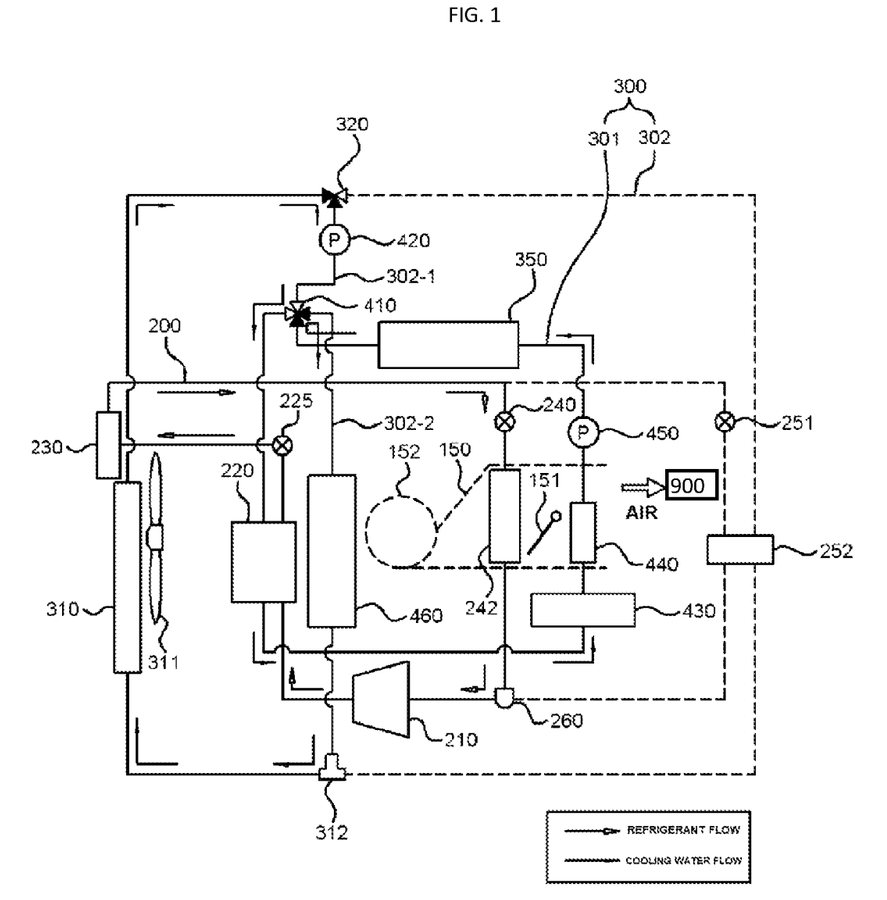
FIG. 1 is a configuration diagram illustrating a system in which a battery and an electrical component are cooled by a radiator in a vehicle interior cooling mode of a thermal management system according to an embodiment of the present invention.
Figure 2:
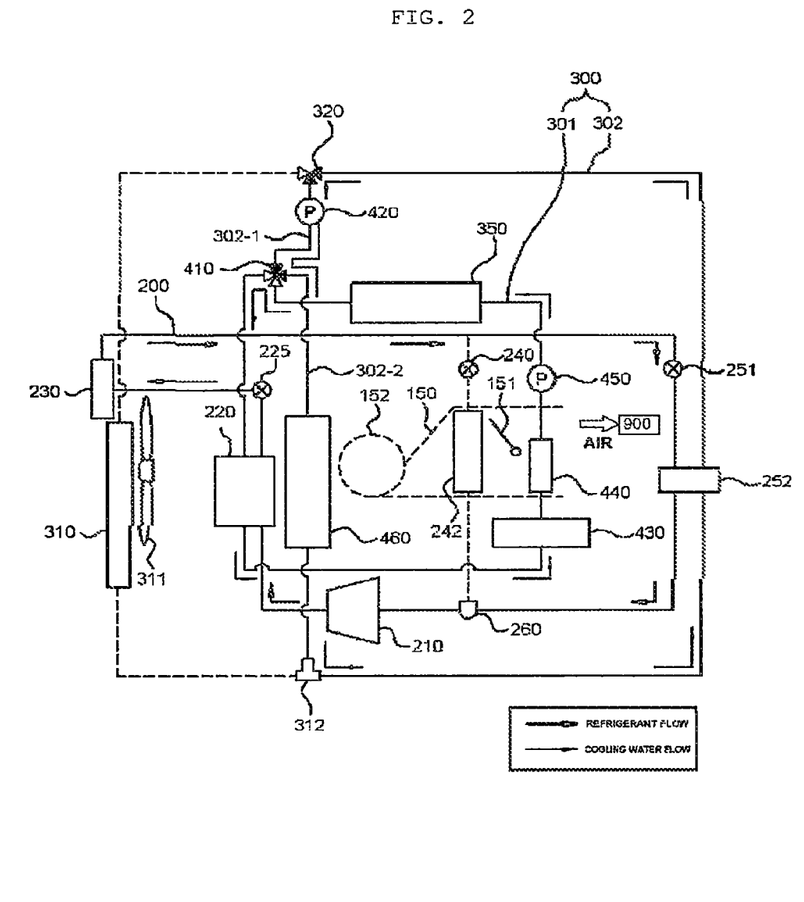
FIG. 2 is a configuration diagram illustrating a system that heats the battery and recovers waste heat of the electrical component to use the heating and the waste heat for heating in a vehicle interior heating mode of the thermal management system according to an embodiment of the present invention.

FIG. 1 is a configuration diagram illustrating a system in which a battery and electrical components are cooled by a radiator in a vehicle interior cooling mode of a thermal management system according to an embodiment of the present invention, and FIG. 2 is a configuration diagram illustrating a system that heats the battery and recovers waste heat of the electrical component to use the heat and the waste heat for heating in a vehicle interior heating mode of the thermal management system according to an embodiment of the present invention.

As illustrated, a thermal management system according to the present invention may generally include a refrigerant circulation line 200 through which refrigerant is circulated to cool the vehicle interior, and a cooling water circulation line 300 through which cooling water is circulated, and the cooling water circulation line 300 may include a heating line 301 for heating and a cooling line 302 for cooling.

The refrigerant circulation line 200 may include a compressor 210, a first heat exchanger 220, a second expansion valve 225, a third heat exchanger 230, a first expansion valve 240, a third expansion valve 251, a second heat exchanger 242, a fourth heat exchanger 252, and an accumulator 260.

The compressor 210 may be an electrical compressor driven by being supplied with power, and serves to suck and compress refrigerant and discharge the refrigerant toward the first heat exchanger 220.

The first heat exchanger 220 serves as a condenser and, for example, a water-cooled condenser may be used. In addition, the first heat exchanger 220 serves to perform heat exchange of the refrigerant discharged from the compressor 210 with cooling water to condense the refrigerant into a liquid refrigerant and transfer the liquid refrigerant toward the second expansion valve 225.

The second expansion valve 225 may serve to throttle or bypass the refrigerant or block a flow of the refrigerant, and may be disposed behind the first heat exchanger 220 in a flow direction of the refrigerant.

The third heat exchanger 230 serves as a condenser or an evaporator, and the function of the third heat exchanger 230 may be varied according to the role of the second expansion valve 225. That is, when the refrigerant circulation line 200 is used as an air conditioner loop, the second expansion valve 225 bypasses the refrigerant and the third heat exchanger 230 serves as a condenser together with the first heat exchanger 220, and when the refrigerant circulation line 200 is used as a heat pump loop, the second expansion valve 225 throttles the refrigerant and the third heat exchanger 230 serves as an evaporator. In addition, the third heat exchanger 230 may be cooled in an air-cooled manner by a cooling fan 311.

The first expansion valve 240 and the third expansion valve 251 may serve to throttle or bypass the refrigerant, or block the flow of the refrigerant. In addition, the first expansion valve 240 and the third expansion valve 251 may be configured in parallel. That is, a refrigerant line may be branched into two lines from the rear of the third heat exchanger 230 in the flow direction of the refrigerant, the first expansion valve 240 may be disposed in one of the two branched refrigerant lines, and the third expansion valve 251 may be disposed in the other refrigerant line.

The second heat exchanger 242 corresponds to an evaporator and the fourth heat exchanger 252 corresponds to a chiller. In addition, the second heat exchanger 242 is disposed at the rear of the first expansion valve 240 in the flow direction of the refrigerant and is provided inside an air conditioner 150 of a vehicle, such that air flowing by a blower 152 of the air conditioner is cooled through the second heat exchanger 242 and supplied to the interior of the vehicle to be used for cooling the interior of the vehicle.

The fourth heat exchanger 252 may be disposed at the rear of the third expansion valve 251 in the flow direction of the refrigerant, and may perform heat exchange with the cooling water to cool or heat the cooling water. As a result, the second expansion valve 240 and the second heat exchanger 242 form a set, the third expansion valve 251 and the fourth heat exchanger 252 form another set, and the two sets are configured in parallel on the refrigerant line. In addition, the refrigerant line may be joined at the rear side of the second heat exchanger 242 and the fourth heat exchanger 252 in the refrigerant flow direction to form a single refrigerant line.

The accumulator 260 may serve to, temporarily store pressure of the refrigerant on the refrigerant line. In addition, the accumulator 260 may separate a liquid refrigerant and a gaseous refrigerant among refrigerants and supply only the gaseous refrigerant to the compressor 210. Here, the accumulator 260 may be disposed at and connected to a point where the refrigerant line is joined at the rear side of the second heat exchanger 242 and the fourth heat exchanger 252, and the accumulator 260 may be disposed at the rear of the compressor 210 in the flow direction of the refrigerant. Thus, the refrigerant transferred to the compressor 210 repeats a circulation cycle as described above.

The heating line 301 may include the first heat exchanger 220, a cooling water heater 430, a fifth heat exchanger 440, a first cooling water pump 450, a battery 350, and a first direction switching valve 410.

As the first heat exchanger 220, the water-cooled condenser is used as described above, and the refrigerant and cooling water may be heat-exchanged with each other while passing therethrough.

The cooling water heater 430 is an apparatus for heating cooling water, and may be disposed at and connected to the rear of the first heat exchanger 220 and the front of the fifth heat exchanger 440 in the flow direction of the cooling water. In addition, the cooling water heater 430 may be operated when a temperature of the cooling water is a specific temperature or less, and may be formed in various ways, such as an induction heater, a seed heater, a PTC heater, a film heater, and the like that may generate heat using power.

The fifth heat exchanger 440 may be provided in the air conditioner 150 of the vehicle and may serve as a heater core. That is, in the fifth heat exchanger 440, the air flowing by the blower 152 of the air conditioner 150 is heated through the fifth heat exchanger 440 and supplied to the interior of the vehicle to be used for heating the interior of the vehicle. In addition, the fifth heat exchanger 440 may be disposed at the rear of and connected to the cooling water heater 430 in the flow direction of the cooling water.

The first cooling water pump 450 is a means for pumping the cooling water so that the cooling water is circulated along the heating line 301, and may be disposed at and connected to the rear of the fifth heat exchanger 440 in the flow direction of the cooling water.

The battery 350 is a power source of the vehicle and may be a driving source of various electrical components 460 in the vehicle. Alternatively, the battery 350 may serve to store electricity by being connected to the fuel cell, or to store electricity supplied from the outside. In addition, the battery 350 may be disposed at the rear of the fifth heat exchanger 440 in the flow direction of the cooling water, and may be cooled or heated by heat-exchanged with flowing cooling water. In addition, the battery 350 may be a solid electrolyte cell having a relatively high operating temperature condition compared to general cells.

The first direction switching valve 410 may be installed between the battery 350 and the first heat exchanger 220, and may be configured to selectively connect or disconnect between the heating line 301 and the cooling line 302 to be described later. In more detail, the first direction switching valve 410 is installed on the heating line 301 so that two cooling water line pipes may be connected to the first direction switching valve 410, one first connection line 302-1 branched from one side of the cooling line 302 may be connected to the first direction switching valve 410, and one second connection line 302-2 branched from the other side of the cooling line 302 may be connected to the first direction switching valve 410. That is, four cooling water lines are connected to the first direction switching valve 410 so as to meet at the first direction switching valve 410, and the first direction switching valve 410 may be a four-way direction switching valve capable of adjusting a state in which the four cooling water lines are connected to each other or blocked.

As a result, in the heating line 301, a cycle in which the cooling water is circulated along the first heat exchanger 220, the cooling water heater 430, the fifth heat exchanger 440, the first cooling water pump 450, the battery 350, and the first direction switching valve 410, and is circulated by being introduced into the first heat exchanger 220 again from the first direction switching valve 410 may be repeated.

The cooling line 302 includes a sixth heat exchanger 310, a second direction switching valve 320, a second cooling water pump 420, the first direction switching valve 410, the electrical component 460, and the fourth heat exchanger 252.

The sixth heat exchanger 310 serves as a radiator for cooling the cooling water, and the sixth heat exchanger 310 may be cooled in an air-cooled manner by a cooling fan 311.

The second direction switching valve 320 is installed on the cooling line 302 so that two cooling water pipes are connected to the second direction switching valve 320, and the first direction switching valve 410 and the second direction switching valve 320 may be connected to the first connection line 302-1 so that the heating line 301 and the cooling line 302 are connected. That is, three cooling water lines are connected to the second direction switching valve 320 so as to meet at the second direction switching valve 320, and the second direction switching valve 320 may be a three-way direction switching valve capable of adjusting a state in which the three cooling water lines are connected to each other or blocked.

The second cooling water pump 420 is a means for pumping the cooling water so that the cooling water is circulated along the cooling line 302. In addition, the second cooling water pump 420 is installed on the first connection line 302-1 between the first direction switching valve 410 and the second direction switching valve 320 such that the cooling water may flow from the second direction switching valve 320 toward the first direction switching valve 410 by an operation of the second cooling water pump 420.

The electrical component 460 may be disposed on a second connection line 302-2 that connects a joint portion 312 formed on the cooling line 302 and the first direction switching valve 410, and the electrical component 460 may be cooled by the cooling water. Alternatively, the electrical component 460 may also be disposed on the first connection line 302-1 connecting the first direction switching valve 410 to the second direction switching valve 320. In addition, the electrical component 460 may be a motor, an inverter, an On Board Charger (OBC), or the like.

The fourth heat exchanger 252 may be connected to the cooling water line between the second direction switching valve 320 and the joint portion 312. As a result, the refrigerant and the cooling water are heat-exchanged in the fourth heat exchanger 252, so that the cooling water may be cooled by the refrigerant or, conversely, the cooling water may be heated by the refrigerant.

As a result, since it is easy to heat the battery 350 by using the cooling water of the heating line 301, an initial operating performance of the battery may be improved, and since the temperature of the cooling water flowing into the first heat exchanger 220, which is the water-cooled condenser, is lowered, heat exchange efficiency may be improved when the refrigerant circulation line 200 is used as a heat pump loop. In addition, there is an advantage that the number of direction switching valves is reduced and the configuration of the cooling water line is simplified.

In addition, the air conditioner 150 may have a blower 152 installed on one side thereof to blow air, and a temperature control door 151 may be installed inside the air conditioner 150. In addition, the second heat exchanger 242 corresponding to the evaporator in the air conditioner and the fifth heat exchanger 440 corresponding to the heater core may be disposed and configured so that the air discharged from the blower 152 according to the operation of the temperature control door 151 may pass through only the second heat exchanger 242 and then be introduced into the vehicle interior, or may pass through the second heat exchanger 242 and then pass through the fifth heat exchanger 440 to be introduced into the vehicle interior.

Hereinafter, an operation according to the operation mode of the thermal management system described above will be described.

1. Cooling of Electrical Component and Battery by Radiator in Indoor Cooling Mode FIG. 1 is a configuration diagram illustrating a system in which a battery and electrical components are cooled by a radiator in a vehicle interior cooling mode of a thermal management system according to an embodiment of the present invention.

Referring to FIG. 1, the compressor 210 of the refrigerant circulation line 200 operates, and high temperature and high pressure refrigerant is discharged from the compressor 210. In addition, the refrigerant discharged from the compressor 210 is cooled by being heat-exchanged with cooling water in the first heat exchanger 220. Subsequently, the refrigerant cooled in the first heat exchanger 220 bypasses the second expansion valve 225 and is introduced into the third heat exchanger 230, and the refrigerant is cooled by being heat-exchanged with external air in the third heat exchanger 230. That is, both the first heat exchanger 220 and the third heat exchanger 230 serve as condensers to condense the refrigerant. After the condensed refrigerant is then throttled while passing through the first expansion valve 240 and is expanded, the refrigerant passes through the second heat exchanger 242 and is heat-exchanged with the air blown by the blower 152 of the air conditioner 150 to cool the air while the refrigerant being evaporated, and the vehicle interior cooling is achieved by supplying the cooled air to the interior of the vehicle. The refrigerant evaporated in the second heat exchanger 242 passes through the accumulator 260 and is introduced into the compressor 210 again, and the refrigerant is circulated while repeating the above-described process. At this time, the third expansion valve 251 may block the flow of the refrigerant so that the refrigerant does not flow in a direction of the fourth heat exchanger 252.

Meanwhile, the cooling water of the cooling water circulation line 200 is circulated by the operation of the first cooling water pump 450 and the second cooling water pump 420. In addition, the refrigerant passing through the first heat exchanger 220, the battery 350, and the electrical component 460 are cooled by the cooling water, and the heated cooling water may be cooled by being heat-exchanged with external air by the operation of the cooling fan 311 in the sixth heat exchanger 310. At this time, the first direction switching valve 410 and the second direction switching valve 320 may be adjusted in a direction connecting the heating line 301 and the cooling line 302. In more detail, in the first direction switching valve 410, an upper side and a left side may be connected to each other so that the cooling water flows, and a lower side and a right side may be connected to each other so that the cooling water flows. In addition, in the second direction switching valve 320, a left side and a lower side may be connected to each other so that the cooling water flows, and a connection to a right side may be blocked. As a result, a cycle in which the cooling water is circulated by being passed through the battery 350, the first direction switching valve 410, the electrical component 460, the joint portion 312, the sixth heat exchanger 310, the second direction switching valve 320, the second cooling water pump 420, the first direction switching valve 410, the first heat exchanger 220, the cooling water heater 430, and the fifth heat exchanger 440 in sequence from the first cooling water pump 450, and then being introduced into the first cooling water pump 450 again is repeated. Here, the cooling water may not flow from the second direction switching valve 320 to the joint portion 312 through the fourth heat exchanger 252 by the second direction switching valve 320. In addition, the heating line 301 and the cooling line 302 may be connected or disconnected according to the adjustment of the first direction switching valve 410 and the second direction switching valve 320, and as illustrated, in the vehicle interior heating mode, the heating line 301 and the cooling line 302 are connected to one line in series so that the cooling water may flow.

2. Heat Battery and Recovery Waste Heat of Electrical Component in Vehicle Interior Heating Mode FIG. 2 is a configuration diagram illustrating a system that heats the battery and recovers waste heat of the electrical component to use the heat and the waste heat for heating in a vehicle interior heating mode of the thermal management system according to an embodiment of the present invention.

Referring to FIG. 2, the compressor 210 of the refrigerant circulation line 200 operates, and a high temperature and high pressure refrigerant is discharged from the compressor 210. In addition, the refrigerant discharged from the compressor 210 is cooled by being heat-exchanged with cooling water in the first heat exchanger 220, and the cooling water is heated by the refrigerant. Subsequently, the refrigerant cooled in the first heat exchanger 220 is throttled and expanded while passing through the second expansion valve 225, and the refrigerant introduced into the third heat exchanger 230 is evaporated by being heat-exchanged with external air to absorb external heat. That is, the first heat exchanger 220 serves as a condenser, and the heat exchanger 230 serves as an evaporator. Subsequently, the refrigerant that has passed through the third heat exchanger 230 bypasses the third expansion valve 251 and is introduced into the fourth heat exchanger 252, and in the fourth heat exchanger 252, the refrigerant is heat-exchanged with the cooling water to heat the refrigerant and the cooling water is cooled. The refrigerant that passed through the fourth heat exchanger 252 passes through the accumulator 260 and is introduced into the compressor 210 again, and the refrigerant is circulated while repeating the above-described process. At this time, the first expansion valve 240 may block the flow of the refrigerant so that the refrigerant does not flow in a direction of the second heat exchanger 242.

Meanwhile, as for the cooling water of the cooling water circulation line 300, the first direction switching valve 410 and the second direction switching valve 320 are adjusted so that the heating line 301 and the cooling line 302 do not communicate with each other. That is, the heating line 301 and the cooling line 302 are disconnected from each other. As a result, the heating line 301 and the cooling line 302 each form a closed loop. At this time, in the heating line 301, the cooling water is circulated by the operation of the first cooling water pump 450, the cooling water is heated by absorbing heat from the refrigerant, and the vehicle interior 900 is heated using the heated cooling water. In the cooling line 302, the cooling water is circulated by the operation of the second cooling water pump 420, the cooling water is heated by absorbing waste heat of the electrical component 460, and then the cooling water is heated by transferring the heat of the cooling water to the refrigerant in the fourth heat exchanger 252. As a result, the heat of the heated refrigerant may be transferred from the first heat exchanger 220 to the cooling water of the heating line 301 again, and the cooling water of the heating line 301 may be heated and used for heating the vehicle interior 900. In more detail, in the first direction switching valve 410, an upper side and a right side may be connected to each other so that the cooling water flows, and a lower side and a left side may be connected to each other so that the cooling water flows. In addition, in the second direction switching valve 320, a right side and a lower side may be connected to each other so that the cooling water flows, and a connection to a left side may be blocked. As a result, a cycle in which the cooling water of the heating line 301 is circulated by passing through the battery 350, the first direction switching valve 410, the first heat exchanger 220, the cooling water heater 430, and the fifth heat exchanger 440 in sequence from the first cooling water pump 450 and being introduced into the first cooling water pump 450 again is repeated. At this time, the air is heated by being heat-exchanged with the air blown by the blower 152 of the air conditioner 150 while passing through the fifth heat exchanger 440, such that the vehicle interior heating is achieved by supplying the heated air to the vehicle interior 900. In addition, a cycle in which the cooling water of the cooling line 302 is circulated by passing through the electrical component 460, the joint portion 312, the fourth heat exchanger 252, and the second direction switching valve 320 in sequence from the second cooling water pump 420 and being introduced into the second cooling water pump 420 again is repeated. Here, the cooling water may not flow from the second direction switching valve 320 to the joint portion 312 through the sixth heat exchanger 310 by the second direction switching valve 320. In addition, since the battery 350 is heated by the cooling water circulating along the heating line 301, the initial operating performance of the battery 350 may be improved, and since the temperature of the cooling water introduced into the first heat exchanger 220 is lowered, the heat exchange efficiency between the refrigerant and the cooling water in the first heat exchanger 220 may be improved. In addition, when a vehicle interior heating load is large, the cooling water heater 430 may be operated to heat the cooling water and used for heating the vehicle interior 900 and heating of the battery 350.

3. Defrost Mode in the Vehicle Interior Heating Mode

Figure 3:
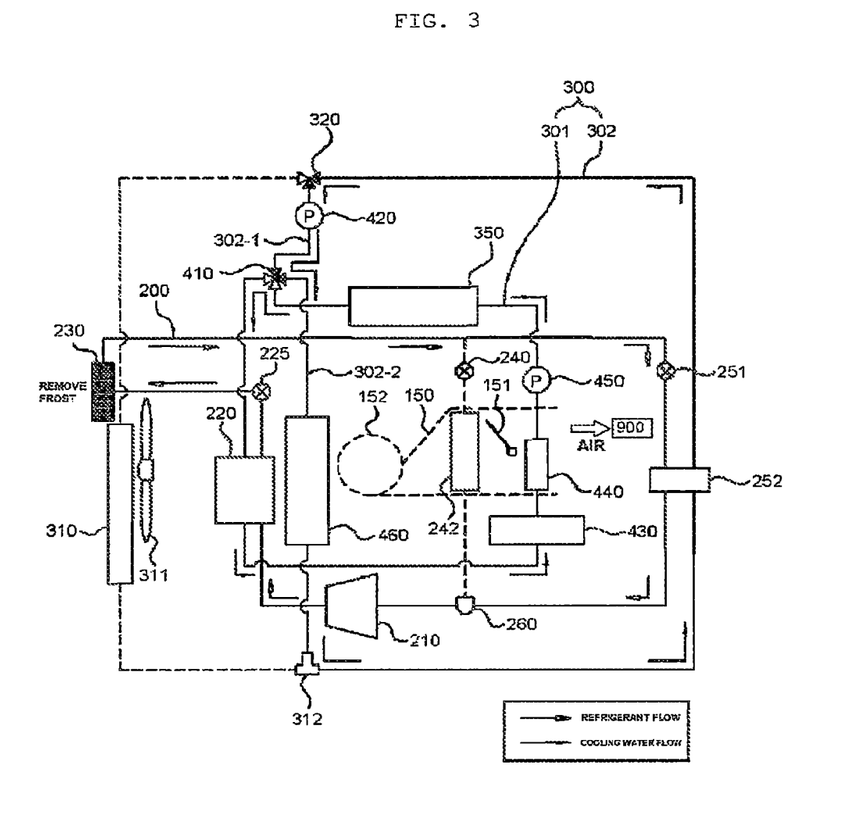
FIG. 3 is a configuration diagram illustrating a system in a defrost mode in the vehicle interior heating mode of the thermal management system according to an embodiment of the present invention.

FIG. 3 is a configuration diagram illustrating a system in a defrost mode in the vehicle interior heating mode of the thermal management system according to an embodiment of the present invention.

Referring to FIG. 3, as described above, when the refrigerant circulation line 200 operates as the heat pump loop when heating the battery and recovering the waste heat of the electrical component in the indoor heating mode, since the third heat exchanger 230 operates as the evaporator, and therefore, if a temperature of the outside air is low, frost is formed on a surface of the third heat exchanger 230 and the performance of the third heat exchanger 230 may be rapidly deteriorated. Therefore, in the refrigerant circulation line 200 in the indoor heating mode, the refrigerant bypasses the second expansion valve 225 so that heat dissipation is made to the outside from the third heat exchanger 230 and the frost may be removed. In addition, the refrigerant that has passed through the third heat exchanger 230 is throttled and expanded while passing through the third expansion valve 251, and then the refrigerant and cooling water are heat-exchanged in the fourth heat exchanger 252. The refrigerant that passed through the fourth heat exchanger 252 passes through the accumulator 260 and is introduced into the compressor 210 again, and the refrigerant is circulated while repeating the above-described process. At this time, the first expansion valve 240 may block the flow of the refrigerant so that the refrigerant does not flow in a direction of the second heat exchanger 242. In addition, the cooling water circulation line 300 may be operated in the same manner as when heating the battery and recovering the waste heat of the electrical component in the above-described indoor heating mode.

4. Dehumidification Mode in the Vehicle Interior Heating Mode

Figure 4:
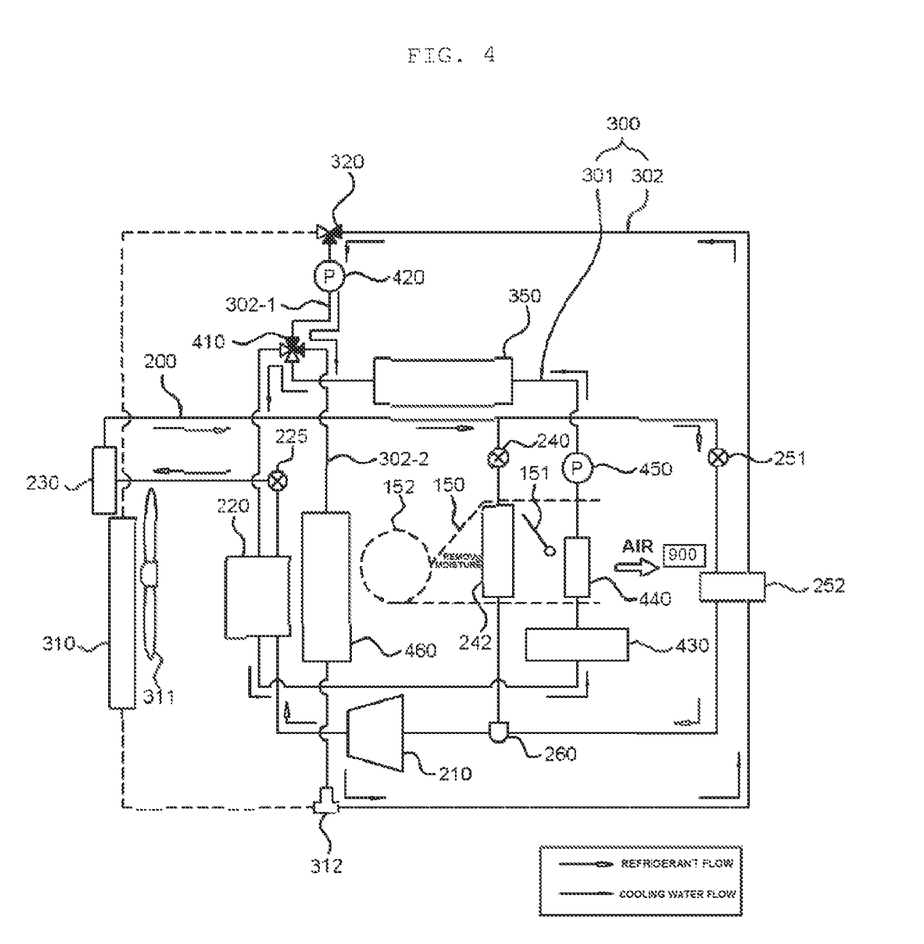
FIG. 4 is a configuration diagram illustrating a system in a dehumidification mode in the vehicle interior heating mode of the thermal management system according to an embodiment of the present invention.

FIG. 4 is a configuration diagram illustrating a system in a dehumidification mode in the vehicle interior heating mode of the thermal management system according to an embodiment of the present invention.

Referring to FIG. 4, as described above, when the refrigerant circulation line 200 operates as the heat pump loop when heating the battery and recovering the waste heat of the electrical component in the vehicle interior heating mode, the system may be operated in dehumidification mode to remove moisture from the vehicle interior 900. At this time, the refrigerant circulation line 200 and the cooling water circulation line 300 may be operated in the same manner as when heating the battery and recovering the waste heat of the electrical component in the above-described vehicle interior heating mode, and in addition, in the refrigerant circulation line 200, the first expansion valve 240 is completely opened to bypass the refrigerant, so that the refrigerant also flows to the second heat exchanger 242, and at this time, moisture may be removed from the air blown by the second heat exchanger 242.

In addition, when dehumidification is required in the above-described defrost mode, the refrigerant is also throttled and expanded in the first expansion valve 240, so that the refrigerant passes through the second heat exchanger 242 and the air may be dehumidified.

5. Heating Mode of Battery

Figure 5:
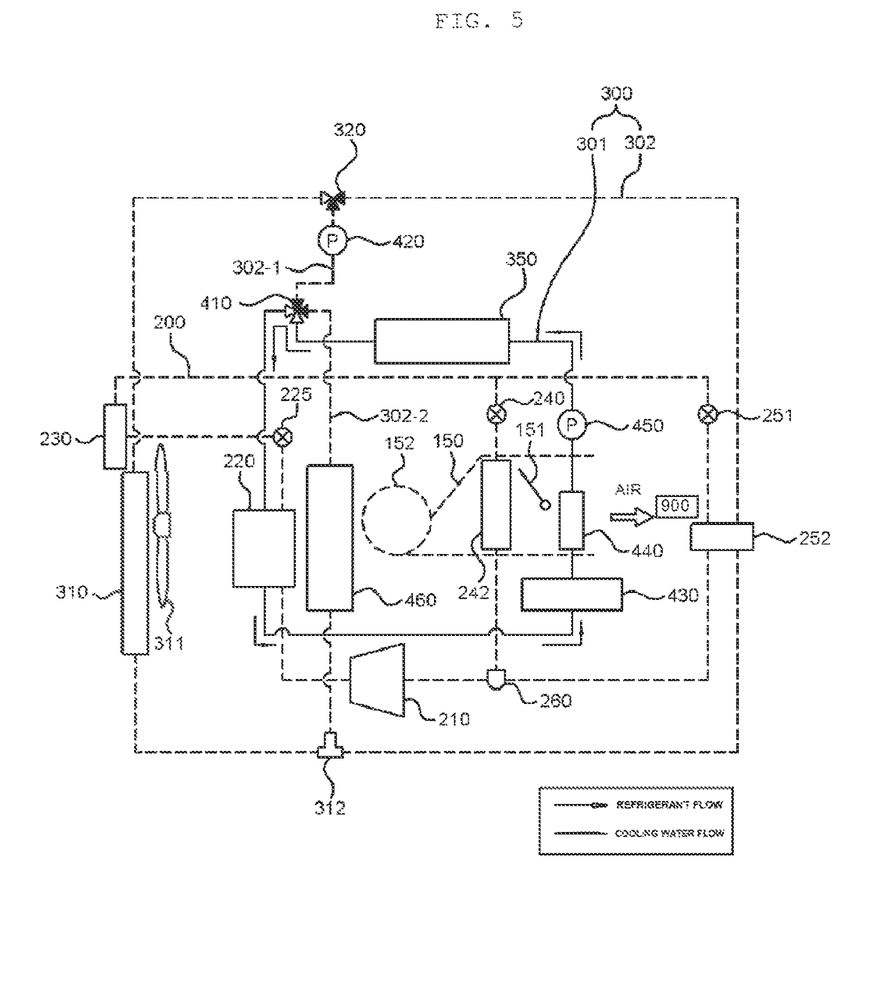
FIG. 5 is a configuration diagram illustrating a system in a heating mode of a battery of the thermal management system according to an embodiment of the present invention.

FIG. 5 is a configuration diagram illustrating a system in a heating mode of a battery of the thermal management system according to an embodiment of the present invention.

Referring to FIG. 5, when only the heating of the battery 350 is required, the refrigerant circulation line 200 is stopped, the cooling line 302 of the cooling water circulation line 300 is also stopped, and only the heating line 301 of the cooling water circulation line 300 may be operated to circulate the cooling water in a closed loop. At this time, the cooling water heater 430 is operated in the heating line 301 to heat the cooling water, and the heated cooling water may heat the battery 350 to improve the initial operating performance of the battery. In addition, when charging the battery, the cooling water heater 430 may be used to heat the battery.

6. Mild Heating Mode

Figure 6:
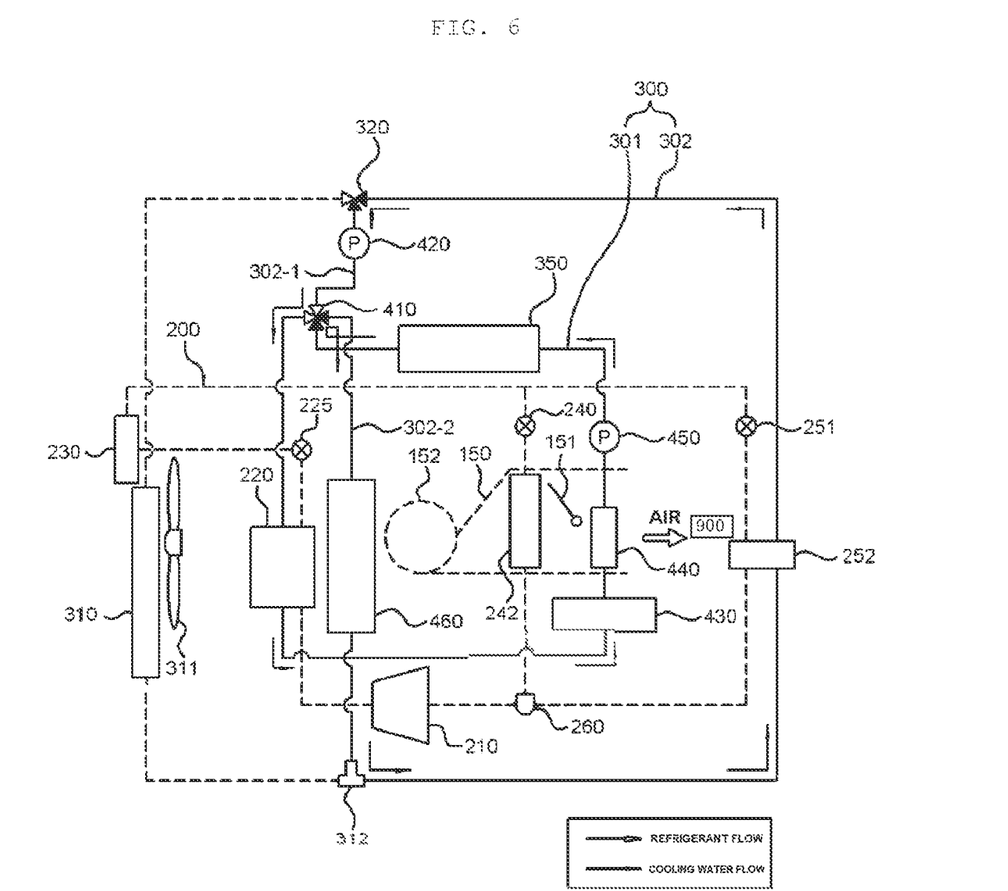
FIG. 6 is a configuration diagram illustrating a system that recovers waste heat of the battery and the electrical component and uses the waste heat for heating in a mild heating mode of the thermal management system according to an embodiment of the present invention.

FIG. 6 is a configuration diagram illustrating a system that recovers waste heat of the battery and the electrical component and uses the waste heat for heating in a mild heating mode of the thermal management system according to an embodiment of the present invention.

Referring to FIG. 6, when the vehicle interior heating load is small, such as in spring or autumn, the system may be operated in a mild heating mode in which heating of the vehicle interior 900 is performed using only waste heat of the battery 350 and the electrical component 460. At this time, the refrigerant circulation line 200 is stopped and the second direction switching valve 320 is adjusted so that the cooling water does not flow from the second direction switching valve 320 of the cooling water circulation line 300 to the joint portion 312 through the sixth heat exchanger 310. As a result, as described above, the cooling water is heated by absorbing waste heat of the battery 350 and the electrical component 460 while circulating the cooling water in the same manner as the cooling water flow in the vehicle interior heating mode, and the cooling water passes through the fifth heat exchanger 440 in the air conditioner 150 and heats the air by being heat-exchanged with the air blown by the blower 152, so that heating of the vehicle interior 900 is achieved by supplying the heated air to the vehicle interior 900.

As described above, since the thermal management system according to the present invention circulates the refrigerant in the vehicle interior cooling mode and the vehicle interior heating mode in the same direction, it is not necessary to change the circulation direction of the refrigerant when switching between the vehicle interior cooling mode and the vehicle interior heating mode, and therefore, a refrigerant direction switching valve for switching the direction of the refrigerant may not be used. In addition, since the heater core of the vehicle air conditioner is used as a heat exchanger for heating, the air conditioner may be shared with the existing internal combustion engine vehicle. In addition, an electric heater for heating and an electric heater for heating the battery may be unified into one cooling water heater. In addition, when a solid electrolyte cell with high operating temperature conditions is applied as the battery, the battery may be heated by using the cooling water after heating in winter, and the temperature of the cooling water introduced into the water-cooled condenser is lowered due to a heating action of the battery, so that heat exchange efficiency may be improved. In addition, the waste heat of the electrical component may be directly used as a heat source for heating or as a heat absorbing source for refrigerant.

The present invention is not limited to the above-described embodiments, and may be variously applied. In addition, the present invention may be variously modified by those skilled in the art to which the present invention pertains without departing from the spirit of the present invention claimed in the claims.

DESCRIPTION OF REFERENCE NUMERALS

150: air conditioner, 151: temperature control door, 152: blower
200: refrigerant circulation line, 210: compressor, 220: first heat exchanger
225: second expansion valve, 230: third heat exchanger, 240: first expansion valve
242 second heat exchanger, 251: third expansion valve, 252: fourth heat exchanger
260: accumulator, 300: cooling water circulation line, 301: heating line
302: cooling line, 302-1: first connection line, 302-2: second connection line
310: sixth heat exchanger, 311: cooling fan, 312: joint portion
320: second direction switching valve, 340: second cooling water pump, 350: battery
410: first direction switching valve, 420: second cooling water pump, 430: cooling water heater
440: fifth heat exchanger, 450: first cooling water pump, 460: electrical component

The invention claimed is:
1. A thermal management system comprising:
a refrigerant circulation line including a compressor, a first heat exchanger, a first expansion valve, and a second heat exchanger configured for cooling a vehicle interior by circulating a refrigerant;
a heating line configured for heating the vehicle interior by circulating cooling water heat-exchanged with the refrigerant through the first heat exchanger and heat-exchanged with a battery;
a cooling line configured for cooling an electrical component by circulating cooling water heat-exchanged with air or the refrigerant;
a second expansion valve for throttling or bypassing a refrigerant discharged from the first heat exchanger;
a third heat exchanger configured for heat-exchanging a refrigerant discharged from the second expansion valve with air and discharging a refrigerant to the first expansion valve;
a third expansion valve configured for throttling or bypassing a refrigerant discharged from the first heat exchanger, or for blocking a flow of a refrigerant; and
a fourth heat exchanger configured for heat-exchanging a refrigerant discharged from the third expansion valve with cooling water of the cooling line.

2. The thermal management system of claim 1, wherein the battery is a solid electrolyte cell.

3. The thermal management system of claim 1, wherein the heating line and the cooling line are connected or disconnected according to a vehicle interior cooling mode or a vehicle interior heating mode.

4. The thermal management system of claim 3, wherein in the vehicle interior cooling mode, the heating line and the cooling line are connected to each other.

5. The thermal management system of claim 4, wherein the heating line and the cooling line are connected to one line in series.

6. The thermal management system of claim 3, wherein in the vehicle interior heating mode, the heating line and the cooling line are disconnected from each other.

7. The thermal management system of claim 6, wherein the cooling line includes: a first connection line branched from one side of the cooling line and connected to the heating line; and a second connection line branched from the other side of the cooling line and connected to the heating line.

8. The thermal management system of claim 7, wherein the first connection line, the second connection line, and the heating line are connected to a first direction switching valve, so that the cooling line and the heating line are connected or disconnected by the first direction switching valve.

9. The thermal management system of claim 7, wherein the electrical component is disposed on the first connection line or on the second connection line.

10. The thermal management system of claim 1, wherein the electrical component is cooled by cooling water heat-exchanged with the fourth heat exchanger.

11. The thermal management system of claim 1, wherein the cooling line further includes a radiator for cooling the cooling water with air, and the electrical component is cooled by cooling water cooled by the radiator or cooling water cooled by the fourth heat exchanger.

12. The thermal management system of claim 11, wherein the fourth heat exchanger and electrical component are connected in series or in parallel by the cooling line.

13. The thermal management system of claim 1, wherein the heating line includes:
a fifth heat exchanger configured for heat-exchanging cooling water heat-exchanged with a refrigerant through the first heat exchanger and air introduced into the vehicle interior to heat the vehicle interior using heated air; and a cooling water heater disposed upstream of the fifth heat exchanger in a flow direction of cooling water to heat cooling water.

14. The thermal management system of claim 10, wherein in a defrost mode in a vehicle interior cooling mode, the second expansion valve bypasses a refrigerant.

15. The thermal management system of claim 1, wherein in a dehumidification mode in a vehicle interior cooling mode, a refrigerant throttled through the first expansion valve passes through the third heat exchanger, and air introduced into the vehicle interior is dehumidified through the third heat exchanger and then heated through a fifth heat exchanger and then supplied to the vehicle interior.

16. The thermal management system of claim 13, wherein in a heating mode of the battery, the battery is heated by cooling water heated by an operation of the cooling water heater.

17. The thermal management system of claim 1, wherein in a mild heating mode, the heating line and the cooling line are connected to one line in series to recover waste heat of the battery and the electrical component and use the waste heat for heating the vehicle interior.

18. A thermal management system comprising:
a refrigerant circulation line including a compressor, a first heat exchanger, a first expansion valve, and a second heat exchanger configured for cooling a vehicle interior by circulating a refrigerant;
a heating line configured for heating the vehicle interior by circulating cooling water heat-exchanged with the refrigerant through the first heat exchanger and heat-exchanged with a battery;
a cooling line configured for cooling an electrical component by circulating cooling water heat-exchanged with air or the refrigerant;
a second expansion valve for throttling or bypassing a refrigerant discharged from the first heat exchanger;
a third expansion valve configured for throttling or bypassing a refrigerant discharged from the first heat exchanger or for blocking a flow of refrigerant;
a third heat exchanger configured for heat-exchanging a refrigerant discharged from the second expansion valve with air and discharging a refrigerant to the first expansion valve;
a fourth heat exchanger configured for heat-exchanging a refrigerant discharged from the third expansion valve with cooling water of the cooling line;
a fifth heat exchanger configured for heat-exchanging cooling water heat-exchanged with a refrigerant through the first heat exchanger and air introduced into the vehicle interior to heat the vehicle interior using heated air; and
a cooling water heater disposed upstream of the fifth heat exchanger in a flow direction of cooling water to heat cooling water.

19. A thermal management system comprising:
a refrigerant circulation line including a compressor, a first heat exchanger, a first expansion valve, and a second heat exchanger configured for cooling a vehicle interior by circulating a refrigerant;
a heating line configured for heating the vehicle interior by circulating cooling water heat-exchanged with the refrigerant through the first heat exchanger and heat-exchanged with a battery; and
a cooling line configured for cooling an electrical component by circulating cooling water heat-exchanged with air or the refrigerant;
wherein the refrigerant circulation line further includes:
a second expansion valve throttling or bypassing a refrigerant discharged from the first heat exchanger; and
a third heat exchanger heat-exchanging a refrigerant discharged from the second expansion valve with air and discharging a refrigerant to the first expansion valve;
wherein in a dehumidification mode in a vehicle interior cooling mode, a refrigerant throttled through the first expansion valve passes through the third heat exchanger, and air introduced into the vehicle interior is dehumidified through the third heat exchanger and then heated through a fifth heat exchanger and then supplied to the vehicle interior.

20. A thermal management system comprising:
a refrigerant circulation line including a compressor, a first heat exchanger, a first expansion valve, and a second heat exchanger configured for cooling a vehicle interior by circulating a refrigerant;
a heating line configured for heating the vehicle interior by circulating cooling water heat-exchanged with the refrigerant through the first heat exchanger and heat-exchanged with a battery; and
a cooling line configured for cooling an electrical component by circulating cooling water heat-exchanged with air or the refrigerant;
wherein in a mild heating mode, the heating line and the cooling line are connected to one line in series to recover waste heat of the battery and the electrical component and use the waste heat for heating the vehicle interior.

* * * * *